March 18, 1924.
O. C. CANNON
1,487,537
DIRECTION INDICATOR
Filed Sept. 11, 1920
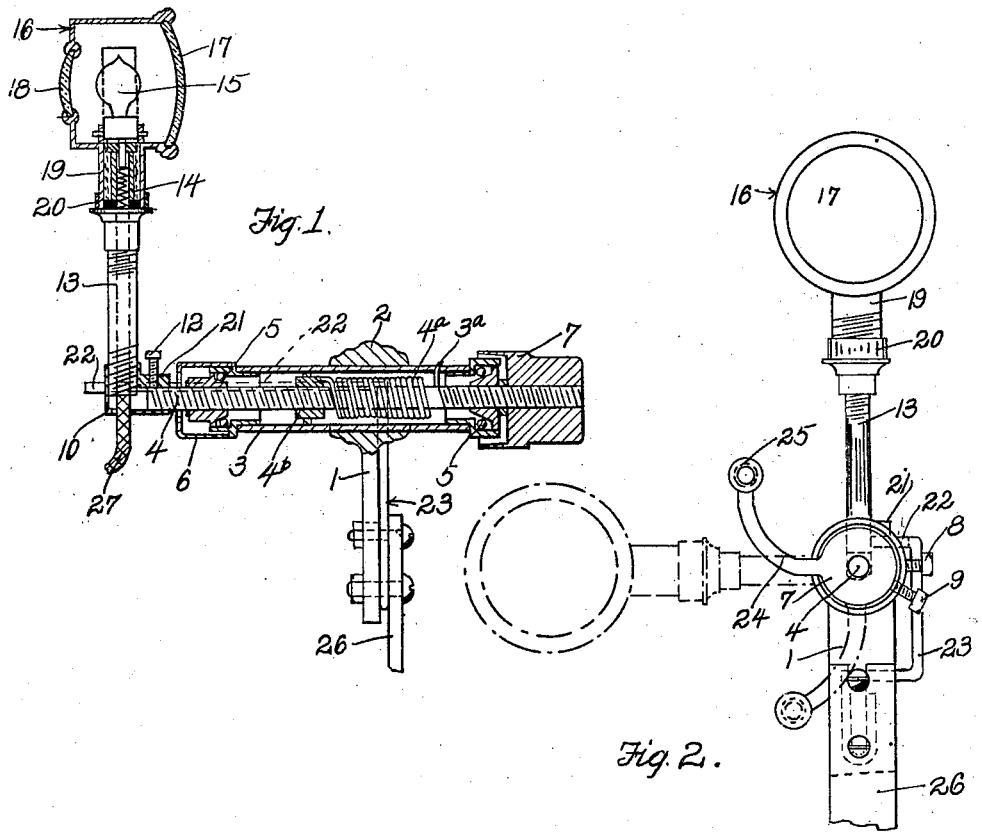
O. C. Cannon,
INVENTOR
BY Victor J. Evans
ATTORNEY Patented Mar. 18, 1924.

1,487,537

UNITED STATES PATENT OFFICE.

OLIVER C. CANNON, OF WILKINSBURG, PENNSYLVANIA.

DIRECTION INDICATOR.

Application filed September 11, 1920. Serial No. 409,631.

*To all whom it may concern:*

Be it known that I, OLIVER C. CANNON, a citizen of the United States, residing at Wilkinsburg, State of Pennsylvania, have invented new and useful Improvements in Direction Indicators, of which the following is a specification.

This invention relates to signalling devices, and more particularly to a lamp adapted for automobile signalling purposes.

One of the main objects of the invention is to provide a lamp of simple construction and operation which is well adapted for use in signalling the intended movements of an automobile upon which the lamp is mounted. A further object is to provide a lamp of simple construction and operation in which the operating parts are effectively housed and protected. Further objects will appear from the detailed description.

In the drawings:

Figure 1 is a side view, partly in section, of the lamp.

Figure 2 is a front view.

A standard 1 is provided at its upper end with a collar 2 through which is secured a sleeve 3. A shaft 4 is rotatably supported through sleeve 3 by ballbearings 5 which are enclosed by caps 6 and 7 secured to the sleeve by set screws 8 and 9, respectively. An elbow 10 is secured on the outer end of shaft 4 by a set screw 12. This elbow carries a tubular member 13 disposed at right angles to shaft 4 and provided at its upper end with a socket 14 of any suitable or preferred type adapted to receive an electric light 15. This light is positioned with a casing 16 in the opposite faces of which are mounted suitable lenses 17 and 18. Casing 16 is provided with a depending neck 19 the lower end of which is threaded into a socket 20 secured on the upper end of member 13.

A coil spring 4ª is mounted about shaft 4 within sleeve 3, one end of this spring being secured to the sleeve at 3ª and the other end of the spring being secured to a collar 4ᵇ secured on shaft 4. This spring acts to turn shaft 4 in a clockwise direction as considered in Figure 2. A lug 21 projects from elbow 10 and is so positioned as to contact with a stop finger 22 of a stop member 23 secured to standard 1, this member being bent to extend upwardly along standard 1 and then outwardly substantially parallel with sleeve 3 to provide the stop finger 22. An arm 24 is carried by cap 7 and is provided at its outer end with an eye 25 by means of which the arm can be connected to a lever or any other suitable means for depressing the same.

Standard 1 is secured to a bracket 26 by means of which the lamp, in practice, may be readily attached to the back of an automobile body, or in any other suitable position. The arm 24 is, in practice, connected to a suitable lever, or any other suitable device, positioned to be operated by the driver of the automobile for depressing arm 24 and moving the light into the position indicated in Figure 2. By swinging the light downwardly into the position indicated the driver signifies his intention of making a turn to the left. In practice the light will be held in this position until the turn is completed. If the driver is going to stop, the light is swung down and is then immediately released thus indicating a stop.

The lamp constructed in this manner may be readily produced at small cost and has all of its operating parts enclosed so as to be protected against injury. In addition, the tubular member 3 is adapted to receive an electric cord 27 inserted through elbow 10 for connecting socket 14 to a suitable source of supply of electricity, this cord being protected and housed by member 13.

What I claim is:—

1. In a direction indicator, a sleeve, a shaft rotatably mounted through the sleeve, anti-friction bearings carried by said shaft and fitting into the ends of the sleeve, a coil spring mounted about the shaft within the sleeve and secured at one end to the shaft and at its other end to said sleeve, the spring acting to rock the shaft in one direction, a signal device connected to said shaft, and means for rocking the shaft in the other direction.

2. In a direction indicator, a sleeve, a shaft rotatably mounted through the sleeve, anti-friction bearings carried by the shaft and fitting into the ends of the sleeve, means within the sleeve for rocking the shaft in one direction, means for rocking the shaft in the other direction, visual signalling means carried by the shaft, and end caps detachably secured on said shaft and enclosing the end portions of the sleeve while preventing endwise movement of the shaft through said sleeve.

3. In a direction indicator, a sleeve, a shaft rotatably mounted through the sleeve, anti-friction bearings carried by the shaft and fitting into the ends of the sleeve, means within the sleeve for rocking the shaft in one direction, a signal device connected to said shaft, and means for rocking the shaft in the other direction.

In testimony whereof I affix my signature.

OLIVER C. CANNON.